US010762277B2

(12) United States Patent
Devi et al.

(10) Patent No.: US 10,762,277 B2
(45) Date of Patent: Sep. 1, 2020

(54) OPTIMIZATION SCHEMES FOR CONTROLLING USER INTERFACES THROUGH GESTURE OR TOUCH

(71) Applicant: Microsoft Corporation, Redmond, WA (US)

(72) Inventors: Renu Devi, Seattle, WA (US); Barnabas Whitfield, Kirkland, WA (US); Kyle Ryan, Sammamish, WA (US); Trevor Harris, Mercer Island, WA (US); Mark Fields, Redmond, WA (US); Michael Herzfeld, Seattle, WA (US); Louisa Lee, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1423 days.

(21) Appl. No.: 14/494,591

(22) Filed: Sep. 24, 2014

(65) Prior Publication Data

US 2015/0012815 A1    Jan. 8, 2015

Related U.S. Application Data

(62) Division of application No. 13/671,832, filed on Nov. 8, 2012, now Pat. No. 8,843,858.
(Continued)

(51) Int. Cl.
*G06F 40/14* (2020.01)
*G06F 3/0488* (2013.01)
(Continued)

(52) U.S. Cl.
CPC ............ *G06F 40/14* (2020.01); *G06F 3/0488* (2013.01); *G06F 3/04842* (2013.01); *G06F 3/04883* (2013.01); *G06F 9/451* (2018.02)

(58) Field of Classification Search
CPC ........ G06F 3/0236; G06F 9/541; G06F 9/547; G06F 9/451; G06F 9/4488;
(Continued)

(56) References Cited

U.S. PATENT DOCUMENTS 7,000,184 B2    2/2006 Matveyenko et al.
7,111,234 B2    9/2006 Peck et al.
(Continued)

FOREIGN PATENT DOCUMENTS

CN    101482795 A    7/2009
JP    2009087224 A    4/2009
(Continued)

OTHER PUBLICATIONS

"Notice of Allowance Issued in Japanese Patent Application No. 2015-515032", dated Mar. 21, 2017, 4 Pages.
(Continued)

*Primary Examiner* — Maryam M Ipakchi
(74) *Attorney, Agent, or Firm* — Liang IP, PLLC

(57) ABSTRACT

A web application provides a custom selection for editing text on a gesture or touch screen. The application replaces native browser handles with selection handles to provide consistent user interface experience across platforms. The application also provides a scheme for semantic interpretation of browser gesture or touch events. The application standardizes browser events into a consistent stream of semantic events that are compatible with a plurality of devices and browsers. The application also provides a gesture or touch optimized user interface in the browser. The application determines gesture or touch input and optimizes the user interface according to the type of input.

20 Claims, 12 Drawing Sheets

Related U.S. Application Data

(60) Provisional application No. 61/653,530, filed on May 31, 2012.

(51) Int. Cl.
*G06F 3/0484* (2013.01)
*G06F 9/451* (2018.01)

(58) Field of Classification Search
CPC .. G06F 11/3495; G06F 2201/86; G06F 40/14; G06F 40/30; G06F 9/45512; G06F 9/4812; G06F 9/542; G06F 16/95; G06F 16/957; G06F 2009/45595; G06F 2213/3808; G06F 3/038; G06F 3/0484; G06F 7/00
See application file for complete search history.

(56) References Cited

U.S. PATENT DOCUMENTS

| | | | |
|---|---|---|---|
| 7,216,290 B2 | 5/2007 | Goldstein et al. | |
| 7,345,678 B2 | 3/2008 | Nurmi | |
| 8,108,787 B2* | 1/2012 | Finger | G06F 9/542 |
| | | | 715/766 |
| 8,255,830 B2 | 8/2012 | Ording et al. | |
| 2002/0097270 A1 | 7/2002 | Keely et al. | |
| 2004/0139413 A1* | 7/2004 | DeHon | G06F 17/5072 |
| | | | 716/121 |
| 2004/0148576 A1* | 7/2004 | Matveyenko | G06F 17/2247 |
| | | | 715/235 |
| 2006/0026281 A1* | 2/2006 | Hodgson | G06F 9/541 |
| | | | 709/224 |
| 2006/0026335 A1* | 2/2006 | Hodgson | H04L 41/0806 |
| | | | 711/1 |
| 2007/0005757 A1* | 1/2007 | Finger | G06F 9/542 |
| | | | 709/224 |
| 2007/0016682 A1* | 1/2007 | Hodgson | H04M 1/72522 |
| | | | 709/228 |
| 2009/0006454 A1 | 1/2009 | Zarzar et al. | |
| 2009/0225037 A1* | 9/2009 | Williamson | G06F 3/04883 |
| | | | 345/173 |
| 2009/0259949 A1* | 10/2009 | Verlaan | G06F 17/2247 |
| | | | 715/760 |
| 2009/0313559 A1 | 12/2009 | Kane | |
| 2010/0235778 A1 | 9/2010 | Kocienda et al. | |
| 2010/0235785 A1 | 9/2010 | Ording et al. | |
| 2010/0306702 A1 | 12/2010 | Warner | |
| 2011/0181528 A1 | 7/2011 | Capela et al. | |
| 2011/0252378 A1* | 10/2011 | Anzures | G06F 9/451 |
| | | | 715/835 |
| 2012/0030566 A1 | 2/2012 | Victor | |
| 2012/0066583 A1* | 3/2012 | Priestley | G06F 9/542 |
| | | | 715/234 |
| 2012/0293440 A1 | 11/2012 | Hotelling et al. | |

FOREIGN PATENT DOCUMENTS

| | | |
|---|---|---|
| JP | 2010519663 A | 6/2010 |
| JP | 2012043452 A | 3/2012 |

OTHER PUBLICATIONS

"First Office Action and Search Report Issued in Chinese Patent Application No. 201310211353.1", dated Nov. 24, 2015, 10 Pages.
"Second Office Action Issued in Chinese Patent Application No. 201310211353.1", dated Aug. 8, 2016, 7 Pages.
International Search Report & Written Opinion for PCT Patent Application No. PCT/US2013/041483, dated Dec. 3, 2013, Filed on May 17, 2013, 12 pages.
"Move or edit an object", Retrieved at <<http://help.adobe.com/en_US/Acrobat/8.0/Professional/help.html?content=WS58a04a822e3e50102bd615109794195ff-7c74.html>>, Retrieved on Apr. 2, 2012, pp. 3.

* cited by examiner

OPTIMIZATION SCHEMES FOR CONTROLLING USER INTERFACES THROUGH GESTURE OR TOUCH

CROSS-REFERENCE TO RELATED APPLICATIONS

This application is a divisional of U.S. patent application Ser. No. 13/671,832 filed on Nov. 8, 2012, which claims the benefit to Provisional Application No. 61/653,530 filed on May 31, 2012 by the same inventor, commonly assigned herewith. Therefore, both applications are herein incorporated by reference in their entireties.

BACKGROUND

Editable text displayed on gesture or touch devices are managed through operating system utilities. The system utilities aid in placing an insertion point or making a selection over content such as drag handles. The utilities rely on a user managing content restricted according browser behavior. If a webpage takes control over the user interaction with content in order to provide a richer web application experience, the utilities may either malfunction or hinder the user.

In scenarios including dragging and clicking, browsers may handle events inconsistently in conventional systems. In addition, conventional systems may address new input to web applications in a complex manner. Conventional systems address such challenges through logic for handling clicks and drags which are dispersed across isolated handlers. Other solutions by conventional systems include duplicating code in event handlers for similar events.

Users may access a web application from a variety of devices: desktops, slates, and laptops with gesture or touch monitors. Most devices support mouse, gestures, touch, or comparable input mechanisms. User interfaces (UIs) that work well for mouse based input do not necessarily work well for gesture or touch input where there is no cursor and imprecise finger.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to providing a user interface to manipulate a selection by creating selection handles under an insertion point and at the ends of a range selection. The handles may replace browser handles. The handles may duplicate the application or operating system selection behavior in gesture or touch based environments. The handles may provide selection consistency across gesture or touch enabled platforms and browsers. The handles may enforce selection behaviors more suited for editing content instead of consuming content.

Other embodiments are directed to providing a scheme for semantic interpretation of browser gesture or touch events. An abstraction layer of an application may serve as an interface between other applications and browsers. Detected browser events in touch or gesture enabled devices may be non-deterministic and vary across devices and browsers. A system executing an application according to embodiments may receive browser events and standardize the browser events into a consistent stream of semantic events (clicks, context menus, drags, etc.) while providing consistency across devices and browsers.

Yet other embodiments are directed to providing a gesture or touch optimized user interface for a browser. In a system executing an application according to embodiments, the user interface may be brought up in response to user action. The user interface may be optimized to match detected type of input such as touch and mouse. Alternatively, the behavior of a particular portion of the user interface may be changed based on the type of input. In addition, a default user interface presented during initialization may be user changeable according to a presented selection criteria.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
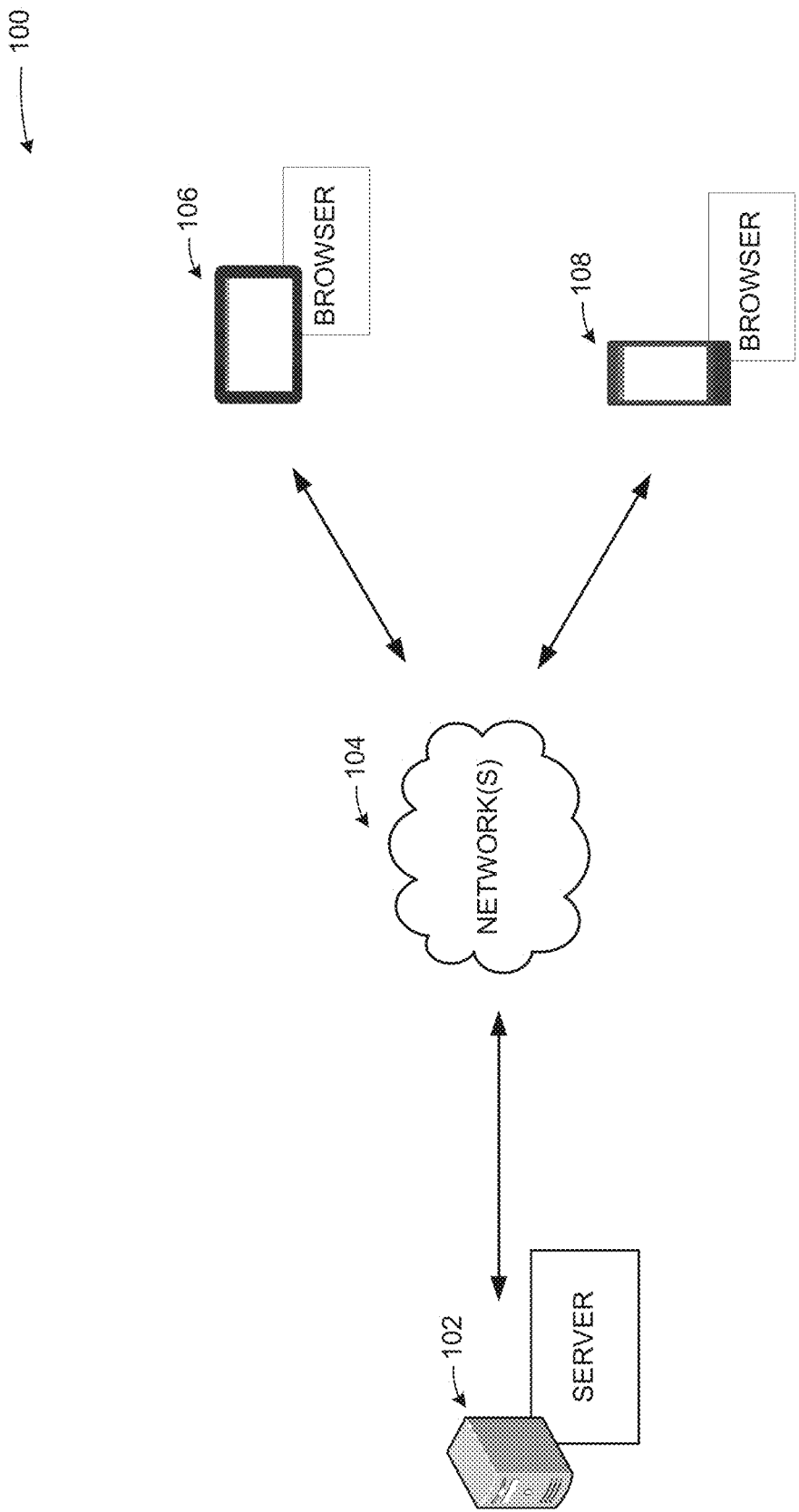
FIG. 1 illustrates an example network diagram where embodiments may be implemented.

As briefly described above, a user interface may be provided to manipulate a selection by creating selection handles under an insertion point and at the ends of a range selection. A scheme may also be provided for semantic interpretation of browser gesture or touch events. In addition, gesture or touch optimized user interface may be provided for a browser.

In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present disclosure is defined by the appended claims and their equivalents.

While the embodiments will be described in the general context of program modules that execute in conjunction with an application program that runs on an operating system on a computing device, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multi-processor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a computer-readable memory device. The computer-readable storage medium can for example be implemented via one or more of a volatile computer memory, a non-volatile memory, a hard drive, a flash drive, a floppy disk, or a compact disk, and comparable media.

Throughout this specification, the term "platform" may be a combination of software and hardware components for providing custom selection for editing content on a gesture or touch screen, a scheme for semantic interpretation of browser gesture or touch events, and a gesture or touch optimized user interface in the browser. Examples of platforms include, but are not limited to, a hosted service executed over a plurality of servers, an application executed on a single computing device, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example operations is provided below.

Referring to FIG. 1, diagram 100 illustrates an example network diagram where embodiments may be implemented. The components and environments shown in diagram 100 are for illustration purposes. Embodiments may be implemented in various local, networked, cloud-based and similar computing environments employing a variety of computing devices and systems, hardware and software.

In an example environment illustrated in diagram 100, custom selection for editing content on a touch screen may be provided by a locally installed or a web application on a client device with touch and/or gesture based input mechanism such as a stationary computing device (a desktop or laptop computer) or a mobile device such as a handheld computer, a tablet 106, a smart phone 108, a vehicle mount computer, etc.). The content may be text, tables, images, etc., and may be created or edited using techniques according to embodiments.

In case of a web application, a server 102 may provide a service (e.g., a spreadsheet service, a word processing service, an email service, or similar ones) and the service may be accessed through a web application via one or more networks 104. Commonly, a specific service may be accessed by a browser on client devices 106 and 108, which may display a user interface for viewing and editing documents of various kinds such as spreadsheets, word processing documents, presentations, emails, graphics documents, and comparable ones.

An application according to embodiments may intercept gesture, touch, and mouse events detected on client devices 106 and 108. The application may stop the gesture and touch events from activating browser or device dependent selection handles. Instead, the application may initiate input optimized selection handles to provide a consistent experience for content selection across platforms.

Figure 2:
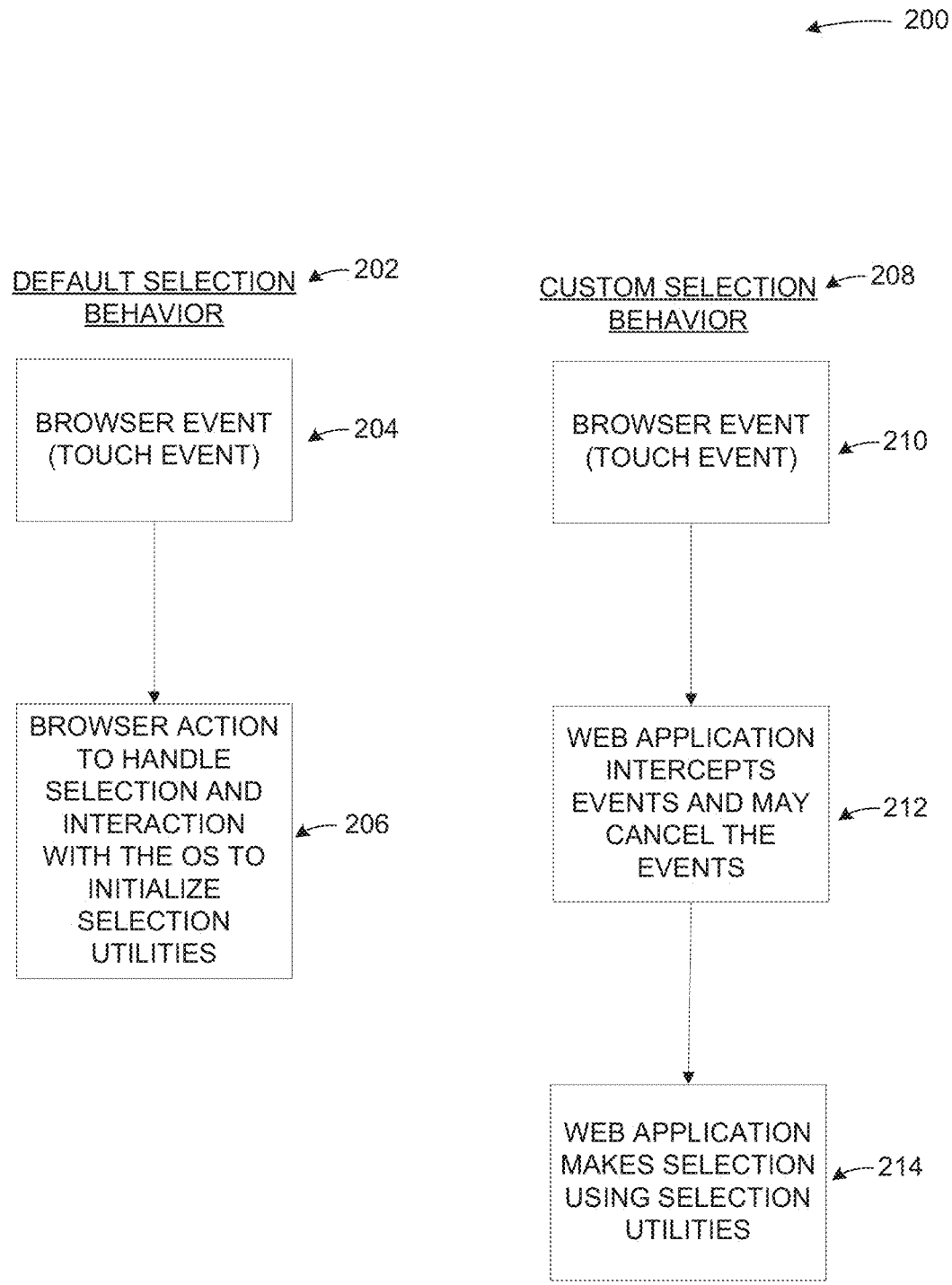
FIG. 2 illustrates example default and custom selection behavior flows according to embodiments.

FIG. 2 illustrates example default and custom selection behavior flows according to embodiments. In diagram 200, an application, such as a web application, may intercept events triggering a browser's selection behaviors and the operating system (OS) selection handles. The application may cancel the browser events, which may prevent the OS from seeing those events and takings actions based on those events. The application may determine the selection corresponding to the browser and/or OS events. The application may display selection handles corresponding to the selection. The application may locate the ends of the range selection and render the corresponding selection handles according to the location of the ends.

In a default selection behavior 202, a browser event 204 such as a detected gesture or touch event may initiate selection of content such as text in an application, for example a browser. The detected browser event may initiate browser action to handle a selection with the operating system 206. The operating system may initialize selection utilities.

In a custom selection behavior 208, the web application may provide a user interface intercepting browser events and replacing the events with selection utilities. Additionally, the application may detect browser event such as a gesture or touch event 210. The application may also intercept the browser event and may cancel the event 212. Furthermore, the application may make a selection using selection utilities provided by the browser 214.

An application according to embodiments may detect a selection of range of text. The selection may be through a gesture or touch input, a mouse input, a keyboard input, etc. Additionally, the application may create selection handles under insertion points of the detected selection. Next, the application may replace native browser handles with input optimized selection handles.

In addition, the application may create two additional selection handles at ends of the selection to provide a user interface to manage the selection. The user interface may enable a user making the selection to expand or contract the selection. The application may also emulate behavior of selection of the native browser handles. The application may emulate default browser selection behavior according to the detected type of input and provide appropriate handles to re-create the behavior of default. Furthermore, the application may provide alternate behavior of selection. The application may execute rules associated with alternative selection behavior. An example may include showing a notification associated with the selection.

Figure 3:
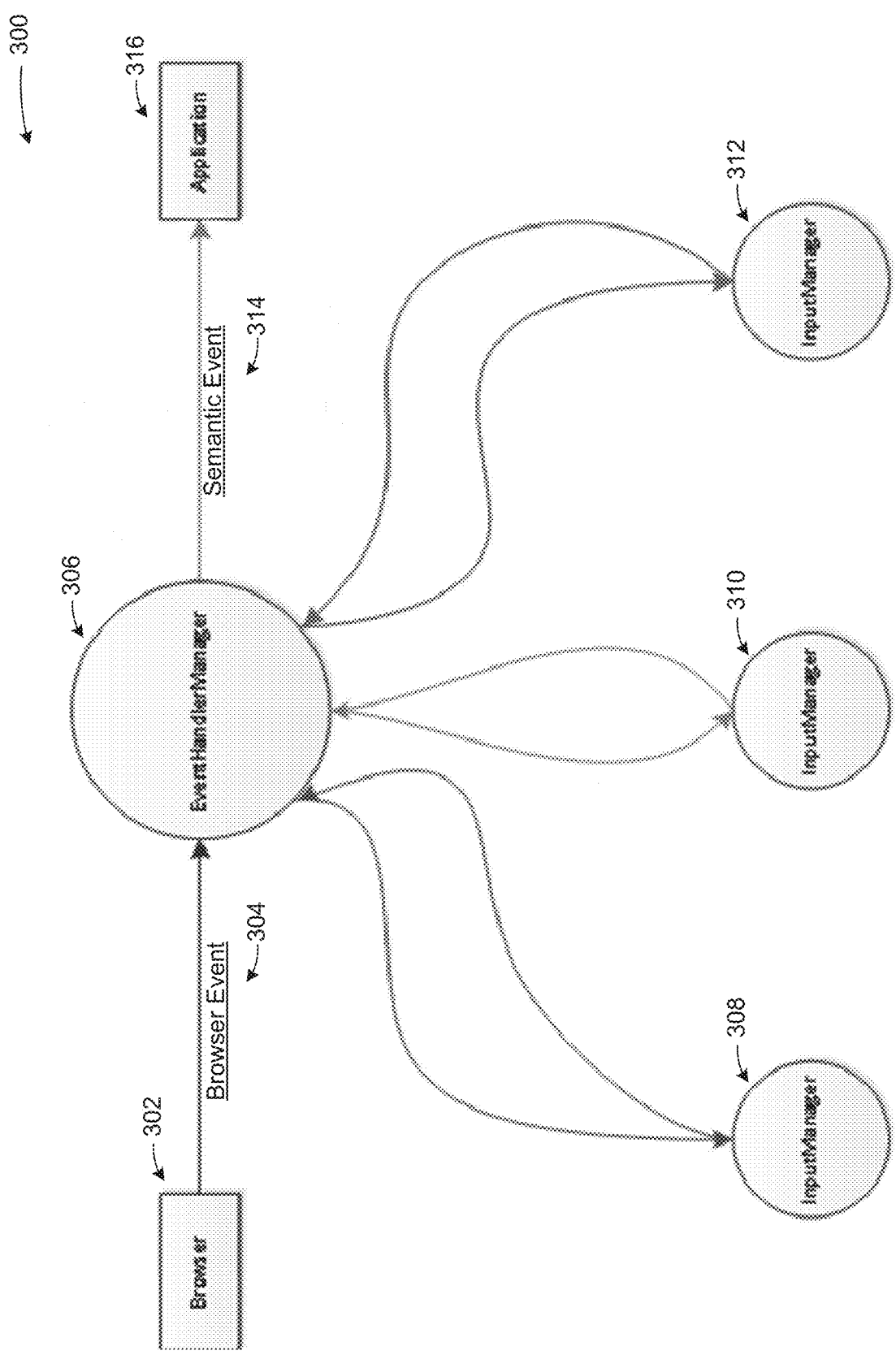
FIG. 3 illustrates an example abstraction layer managing events between browser and application according to embodiments.

FIG. 3 illustrates an example abstraction layer managing events between a browser and a web application according to embodiments. In diagram 300, an event handler manager (EHM) 306 may transmit browser events 304 from browser 302 to an input manager. There may be one or more input managers 308, 310, and 312.

An input manager process an event. The input manager may turn the event into a semantic event 314 comprehensible by the web application 316. The semantic event 314 may then be transmitted to the application by the event handler manager 306. In an example scenario, if an input manager may receive a gesture or touch event from a browser then the input manager may convert the browser event into a gesture or touch click event for transmission to the web application 316.

A scheme according to embodiments may include register event handlers for events that come from the browser (touch start, touch end, touch move, etc.). The register event handler may route events to input managers upon receiving browser events. The input managers may have knowledge of semantic events comprehensible by the application (e.g.: a "click"). The input managers may also keep information about series of browser events make up the semantic event (e.g.: a touch start followed by a touch end make up a click event). The input managers may receive browser events and use their internal knowledge of semantic events to decide whether to inform the application of an occurrence of a semantic event.

An input manager may also have the ability to communicate with other input managers if more than one input manager processes a browser event. An example may include a touch start event from the browser initiating either a click event or a context menu event. As a result, two different input managers may process the browser event.

The input managers may communicate by putting a cache of information on a document object model (DOM) element of the event. Each input manager may process the DOM element upon receiving the event and may query other input managers to determine further processing of the same event.

The event handler manager may also decide an order for routing events to the input managers. The event handler manager may order routing of the events by storing input managers in a priority queue. In an example scenario, the input managers with a priority of 1 may receive events before input managers with a priority of 2. Input managers with the equal priority may receive events in random order. In addition, an input manager may notify the application upon determining an occurrence of a semantic event such as a click. The input manager may also notify other input managers to stop listening for associated semantic events.

In an application according to embodiments, event handler manager code may encompass one large component instead of separating the part of the code receiving browser events from the input managers, another part operating on browser events, and yet another part converting the browser events. Furthermore, the input manager may communicate amongst each other by maintaining references to each other instead of appending a cache of information onto a DOM element associated with the events processed by each input manager.

According to an example embodiment, an input manager handling drag events may take mouse and gesture or touch events and normalize them into drag events comprehensible by the application. For example, a drag input manager (DIM) may manage drag events by using the event handler manager already used by an input manager handling keyboard events and an input manager handling context menu events. The EHM may track registration of event handler proxies with the browser in the DOM, the event handlers the rest of application registers against the DOM. In addition, input managers using the EHM may receive browser events and then normalize them into semantic events comprehensible by the application. The input manager may then pass the normalized semantic event back to the EHM which notifies an appropriate listener in the application.

The DIM may register a number of browser events through the EHM including: mouse down, mouse up, mouse move, click, touch down, touch up, touch move, and touch cancel. The DIM may listen for mouse down or touch down events in order to determine a drag event. The DIM may compare the movement delta with a drag threshold value while receiving mouse move or touch move events. If the mouse move or touch move events move far enough away from an origin value then the DIM may trigger drag events by transmitting drag events to a drag adapter. The drag adapter may be code existing in web application companions (WAC) attached to specific DOM elements. The DIM may also transmit either a mouse event argument or a gesture or touch event argument to the drag adapter to enable the adapter to distinguish between mouse drags and touch drags.

Input managers registered with the EHM for a specific event may be put in a priority queue. A browser event may notify the input managers in priority order upon the EHM catching the browser event. As a result, the DIM may receive mouse, gesture, touch, or similar events to determine if a drag is happening while simultaneously transmitting events interpreted by the DIM as drag events to a mouse input manager (MIM) or touch input manager (TIM) for additional processing.

The DIM may be registered in the EHM at a higher priority than the MIM and TIM. The DIM may cancel events interpreted by the DIM as drag events when it begins to process the events to prevent MIM or TIM from processing the events. In an example scenario, DIM's prevention may stop a context menu from launching during a touch drag.

In some examples, source code specific to dragging may be removed from the MIM and placed in the DIM. The MIM may transmit through the EHM. EHM may remove MIM source code duplicating EHM functionality. MIM may be source code optimized to receive and normalize mouse events not related to dragging.

The TIM may receive gesture or touch events unrelated to dragging and normalize the events for use by the application. The TIM may also use the EHM for browser proxy handler and application handler management. The TIM may register with the EHM for the following browser events: touch down, touch up, touch move, and click. The TIM may receive tap events, touch and hold events, and normalize the events into WAC comprehensible events. The TIM may normalize tap events into click events. The TIM may receive the following events: touch down, touch up, and click when a user taps in a mobile browser.

Upon detecting a click event, the TIM may transmit a click event to the application after attaching a gesture or touch event argument object to the event. The TIM may attach the gesture or touch event in order to inform the application that the click event originated from a gesture or touch event instead of a mouse event. Mobile browsers may generally generate click events after touch down or touch up events are detected by the browser and interpreted as a click event. In an example scenario, click events may not be detected if the browser determines that the user was trying to flick or drag instead of a tap. The DIM may filter out any click events that come immediately after drag events. The TIM may normalize two taps in quick succession into a double click event. A user making two taps in quick succession in a browser may also generate the following events: touch down, touch up, and click.

The TIM may also transmit a click event to the application and begin to listen for a second tap. If the TIM may receive a second click event within a predetermined amount of time (a user or a system may define the time value), then the TIM may transmit the second click event to the application followed by a double click event transmission to the application. Both clicks and the double clicks may be processed by the application. Processing the clicks along with the double click initiated by a double tap may force the application to behave consistently for a double tap and a double click.

The TIM may normalize a touch and hold event into a context menu event. The TIM may receive a touch down event when a user may touch and hold on the screen of a browser. Upon receiving the touch down event, the TIM may initiate a timer that may display the context menu after a predetermined time. After the expiration of the predetermine time, the TIM may transmit the context menu event to the application. If a touch up event is detected before the expiration of the predetermined time, the timer may be cancelled and context menu may not be displayed. Once the TIM transmits a context menu event, if the user does not end the touch and hold, the TIM may simulate a touch up event through the browser to prevent processing a drag event after displaying the context menu.

Application developers may be enabled to provide custom components to register and respond to gesture or touch events. Since TIM may operate by normalizing gesture or touch events into mouse events or context menu events, custom components may register with MIM or an input manager for the context menu through register handlers.

The EHM may transmit to an application handler when the TIM normalizes a click event and requests the EHM to process the click event. The handler methods in the application may receive event handler argument objects which may be used to transmit along information to process the events.

Scrollable content typically may exist in an inline frame. Any scrolling in an application may involve events generated by two fingers. According to embodiments, the event handler manager may provide a basic single-finger scrolling for tablets and similar devices. Such embodiments may perform following actions: (1) create a new scroll drag adapter attached to a DOM element and (2) register the adapter with a DIM for the DOM element with priority "last." The DIM may support a queue of drag adapters attached to an element. DIM may process the scrolling events in order and transmit the events on to the next drag adapter if the current drag adapter may not handle drag events. Priority "last" may mean that any other drag adapters have an opportunity to process before the drag adapter processes the drag events.

Scroll drag adapter may be an internal class which may implement a drag adapter interface. The interface may process scrolling events on the associated DOM element. An on drag start method may remember current position. On drag move method may compute the difference between a new position and the previous position. The on drag move method may set the scroll top and scroll left of the DOM Element to match the difference. A list of points and timestamps may be recorded for each processed drag move event. In an on drag end method, a parabolic regression may be computed to determine a finger's acceleration and execute a page animation accordingly.

Figure 4:
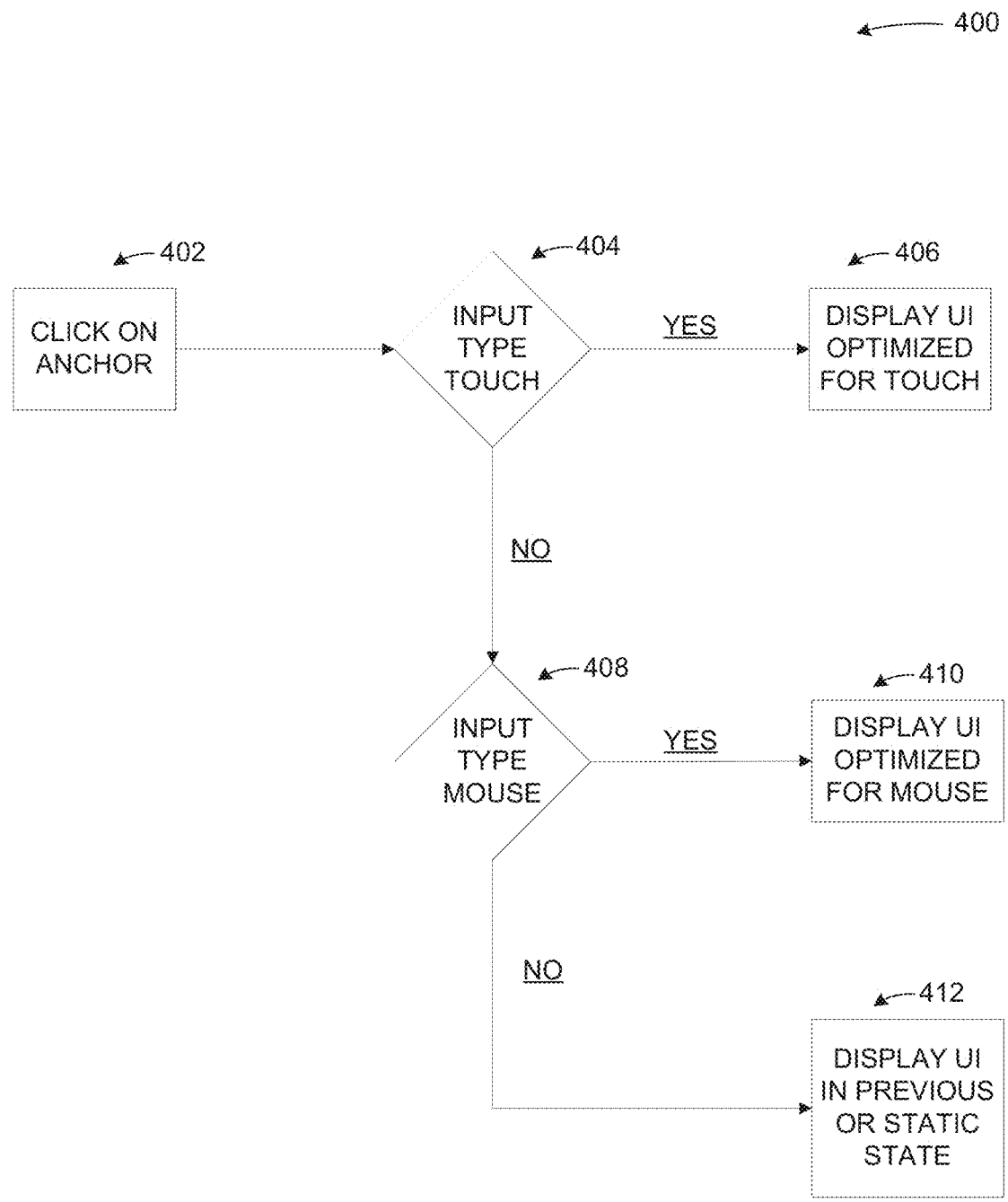
FIG. 4 illustrates a flow diagram showing optimization of a user interface according to embodiments.

FIG. 4 illustrates a flow diagram showing optimization of a user interface according to embodiments. In diagram 400, an application, according to embodiments, may detect a click event on an anchor 402 displayed by the user interface (UI). The application may make a determination about gesture or touch input of the click event 404. If the application may determine touch input, the application may display a UI optimized for gesture or touch 406. If the application may not determine the type of input as gesture or touch then the application may make a determination about a mouse input 408. If the application determines a type of input as mouse based, then the application may display the UI optimized for mouse input 410. If not, the application may show the UI in a previous state or a static state 412.

The application may initiate an anchor element instantiating a dynamic UI. In an example scenario, a button control may initiate a new pane. In another example scenario an editable surface control may initiate a caret.

The UI may be optimized for gesture or touch based controls if the application detects gesture or touch input. In an example scenario large UI controls may be used by the UI for a detected gesture or touch input. The UI may be optimized for mouse based controls if the application detects mouse input. In an example scenario the UI may enable mouse control centric features such as hover within the UI.

Context menu controls may also be similarly optimized according to the type of input for the UI. If the application detected a context menu initiated by a mouse event then mouse control optimized context menu may be initiated within the UI. Alternatively, a gesture or touch control optimized context menu may be initiated within the UI in response to gesture or touch event detected to initiate the context menu.

The application may determine the type of input used on an anchor by registering for a click (or context menu) event, detecting the click event, and evaluating the click event for the type of input. If a browser may not provide the type of input then the type of input may be obtained using an input manager application programming interface (API). A click input manager (CIM) component of the input manager API may notify about a click event and transmit type of input of the click event. The CIM may listen for multiple events to determine the type of input. The CIM may listen for an on click event, and other browser specific gesture or touch events. If a touch start event occurred immediately before a click (e.g.: under 300 ms), the application may conclude that click event was a result of gesture or touch input. Alternatively, an input manager may immediately decide to initiate a click event and determine a gesture or touch input whenever the input manager receives a touch start event followed by a touch end event without any touch move events. If a pointer event with gesture or touch input occurs immediately before a click event, the application may determine the click event coming from a gesture or touch input. A pointer event may not be a gesture or touch event. A custom pointer event implemented by a browser nay initiate for every type of input supported by the browser including but not exclusive to: gesture or touch, pen, and mouse inputs. The browser may transmit the type of input for the event detected through the custom pointer. Alternatively, the application may listen for a gesture event and determine type of input using the information provided by the browser about the gesture event.

The UI may be initially optimized for mouse input. Later, the application may implement gesture or touch input customization by applying cascading style sheets (CSS) which implement size and spacing parameters for gesture or touch input. A CSS class may be added to the top CSS level activating gesture or touch specific styling in that portion of the browser's DOM or UI elements. Alternatively, completely different DOM elements may be generated on dynamic UI when an anchor may be initiated through gesture or touch input. The application may also initiate a UI optimized for keyboard based input. In addition, the application may initiate a dynamic UI optimized for pen based input.

Behavior of the UI may change based on detected type of input. The application may change the behavior of the UI according to a detected click event on a component of the UI. Alternatively, the application may change the behavior of the UI according to a detected gesture or touch event initiated by a finger tap. In an example scenario, the UI may display a split button control. The UI may display a drop down menu allowing a user to change the type of the split button control. The application may execute an action associated with the button control if the user clicks the button control with a mouse. Alternatively, the UI may display a menu if the user taps the button control. The input manager may determine the type of input according to the user action on the split button control.

The application may use a user agent string and a browser specific API to optimize static or boot time UI. The application may use information about the browser to determine mouse, gesture or touch, or a combination input capability of the browser. The static UI may be optimized for mouse input upon detecting a browser with a mouse input only capability. Optimization of the static UI may also be customized according to gesture or touch input or a combination input scenario, as well. Additionally, a button control may be provided to switch the static UI between gesture or touch and mouse input when both may be detected as a capability by the browser. The button control may persist its state between user sessions in a browser cookie.

Figure 5:
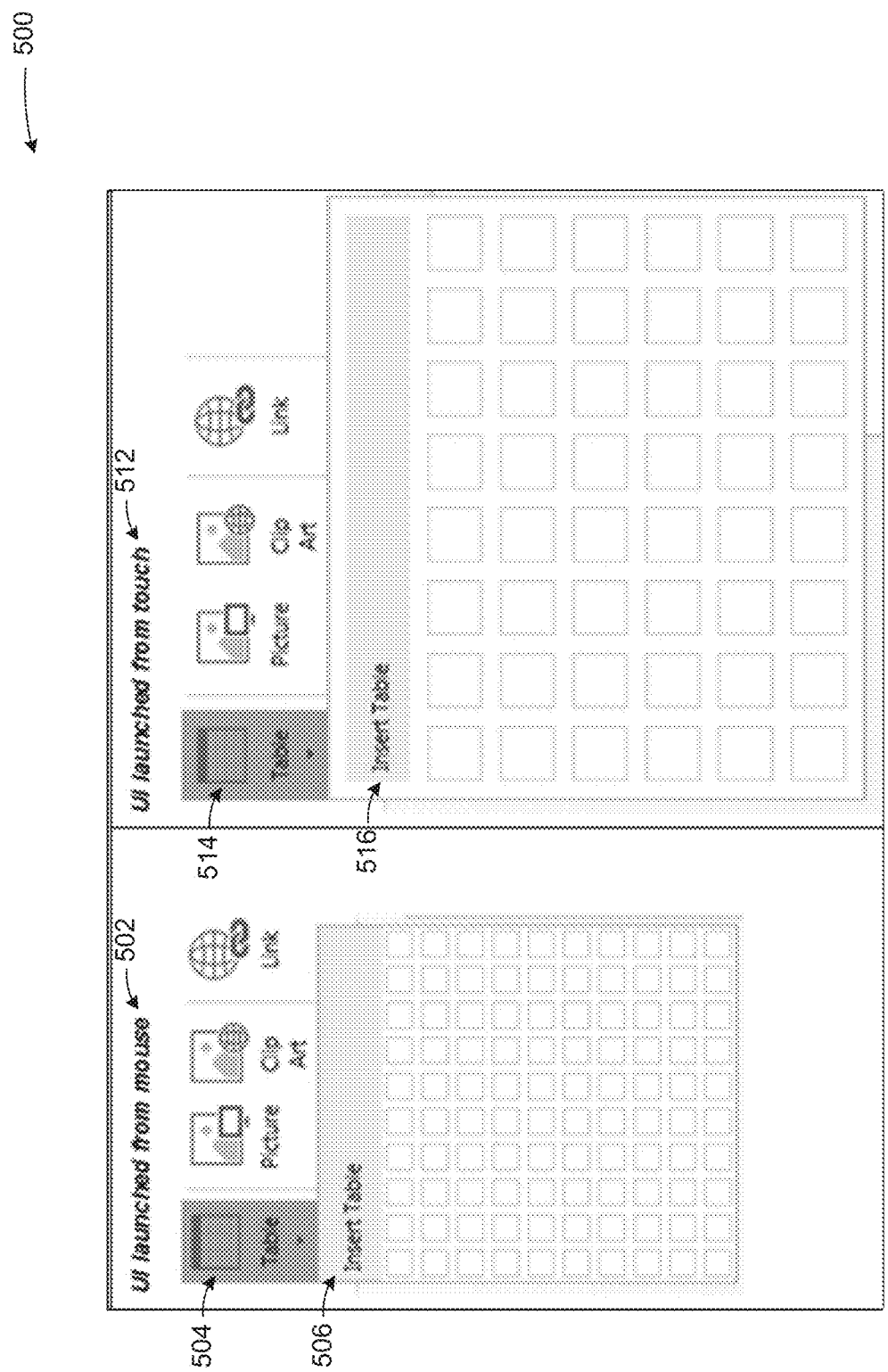
FIG. 5 illustrates examples of optimized user interfaces for table control based on type of input according to embodiments.

FIG. 5 illustrates examples of optimized user interfaces for table control based on type of input according to embodiments. Diagram 500 displays example table control optimized according to mouse input 502 and gesture or touch input 512.

An application managing a UI may detect a type of input of a user action on the UI. The detected user action may be a gesture or touch input or a mouse based input. The UI may be optimized to display table control 502 for mouse input. The UI may display standard size table control 504 and standard size table size selection control 506. The standard size may be a system setting for each component of the UI determined during development of the application. The UI may display standard size controls because a user may be able to move a mouse pointer with more accuracy compared to other types of input.

Alternatively, the UI may display optimized table control 512 for a detected gesture or touch input. The UI may display large size table control 514 and large size table size selection control 516. Large size may be a system setting for each UI component determined according to display characteristics. The UI may display large size controls because a user may be less able to provide fine control over a UI through gesture or touch input.

Figure 6:
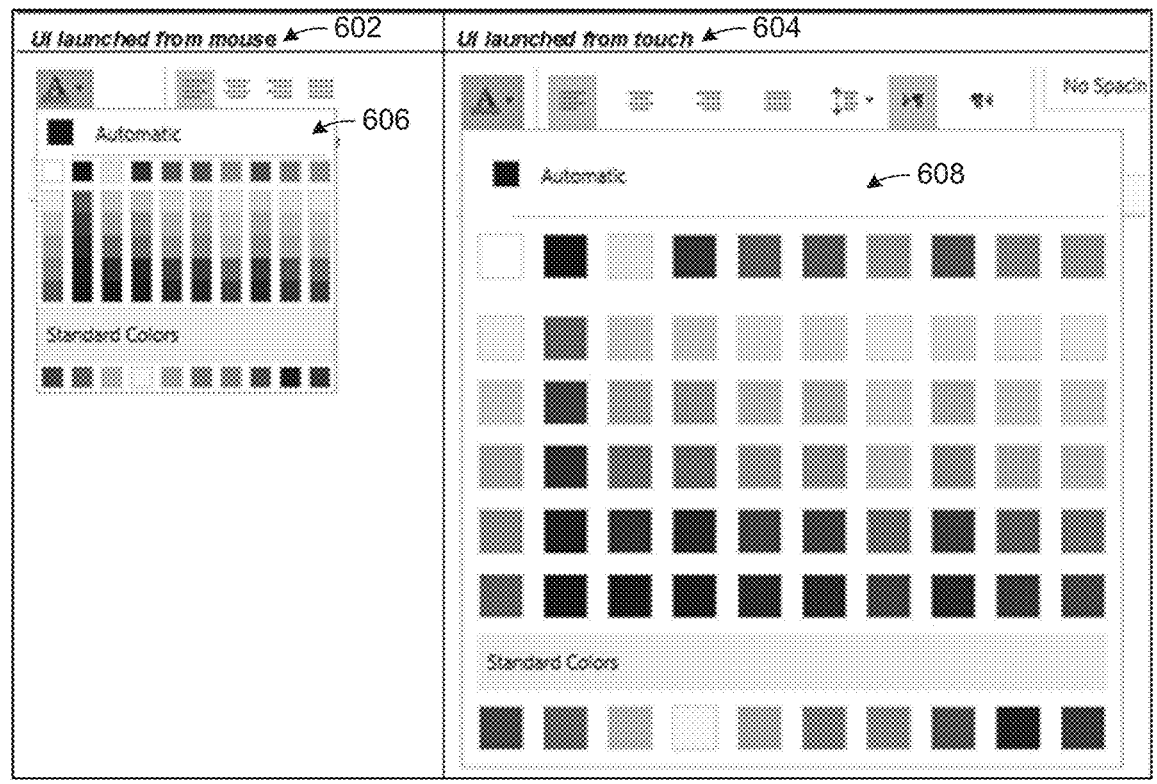
FIG. 6 illustrates examples of optimized user interfaces for color and font control based on detected type of input according to embodiments.
Figure 6:
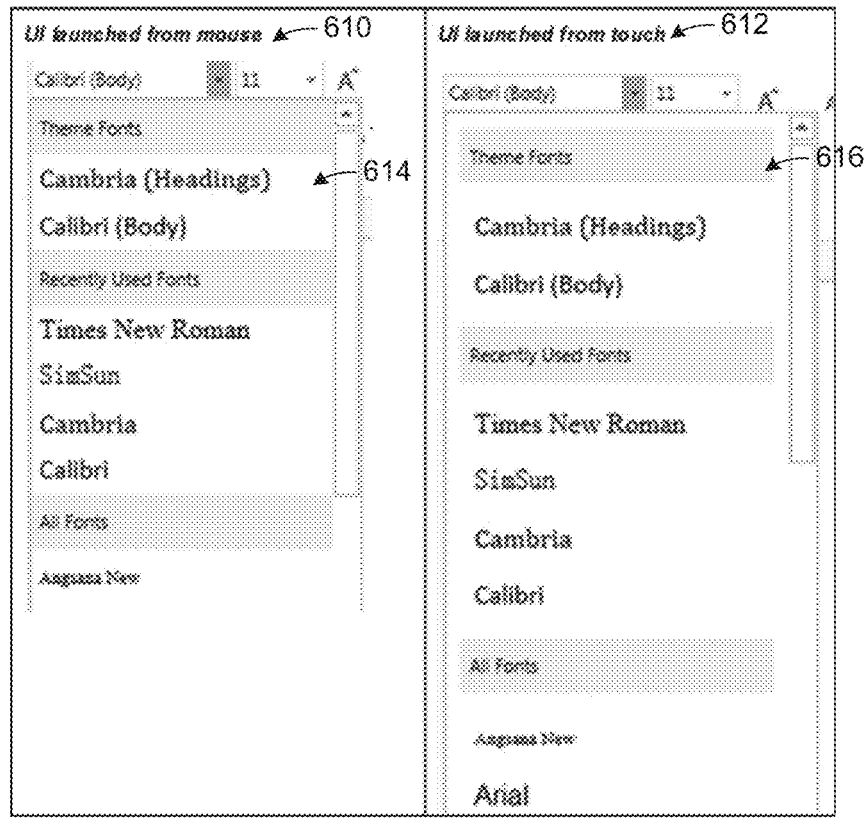

FIG. 6 illustrates examples of optimized user interfaces for color and font control based on detected type of input according to embodiments. Diagram 600 displays example color and font controls optimized according to detected type of input.

An application managing a UI may detect type of input of a user action on the UI as either mouse or gesture or touch based type of input. If the application detects a mouse type of input, the UI may display a mouse type of input optimized color control 602 or font control 610 associated with corresponding user action. The UI may display color control 602 with standard size color selection control 606 or font control 610 with standard size font selection control 614. The UI may display standard size controls because a user may be able to move a mouse pointer with more accuracy compared other types of input.

Alternatively, if the application detects a gesture or touch type of input, the UI may display a gesture or touch input optimized color control 604 or font control 612 associated with corresponding user action. The UI may display color control 604 with large size color selection control 608 or font control 612 with large size font selection control 616. The UI may display large size controls because a user may be less able to provide fine control over a UI through gesture or touch input.

Figure 7:
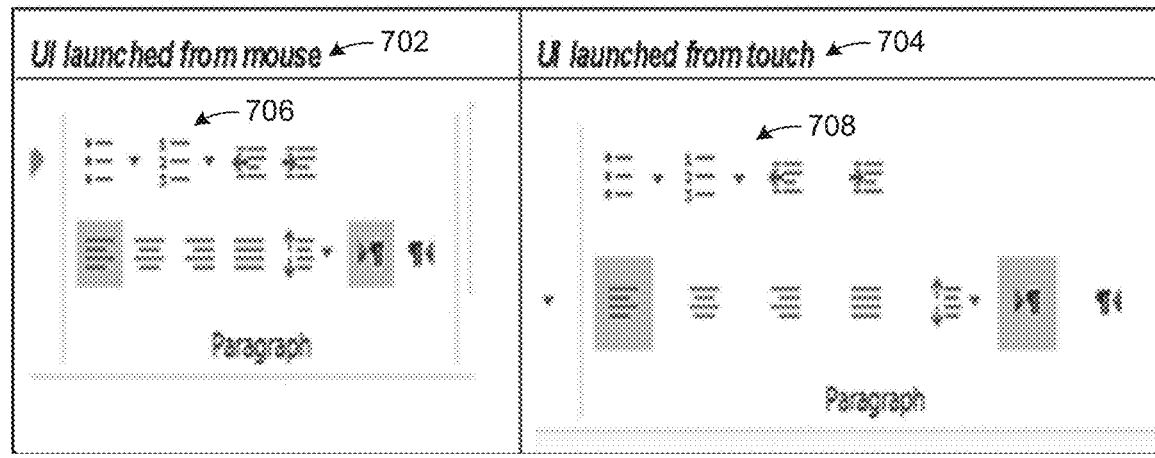
FIG. 7 illustrates examples of optimized user interfaces for style and search control based on detected type of input and a selection control presented to enable an optimized user interface according to embodiments.
Figure 7:
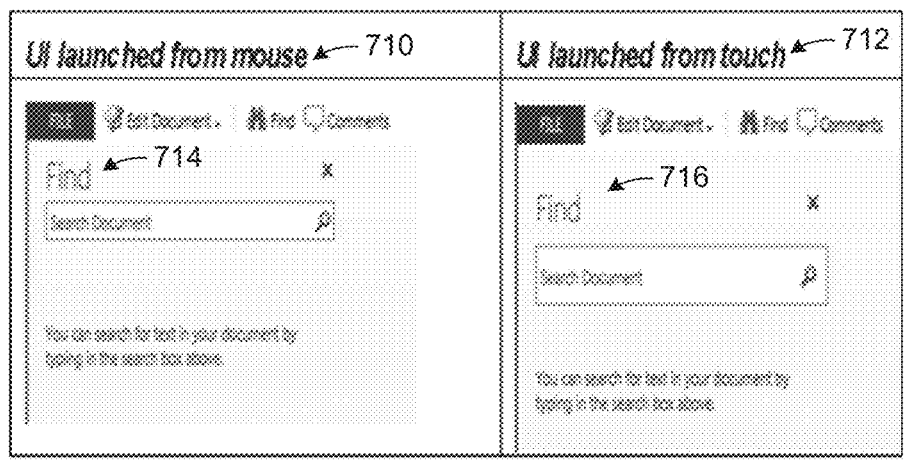
Figure 7:
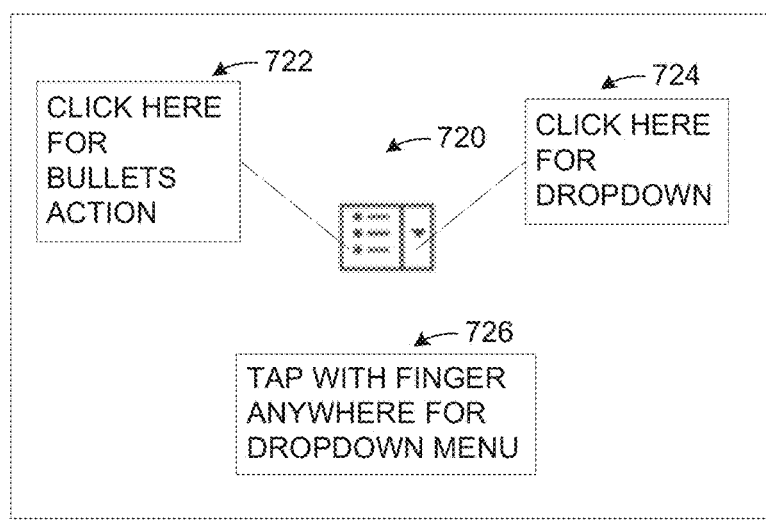

FIG. 7 illustrates examples of optimized user interfaces for style and search control based on detected type of input and a selection control presented to enable an optimized user interface according to embodiments. Diagram 700 displays example text style and search controls optimized according to detected type of input, as well as a drop down control to select an type of input.

The application may detect a type of input of a user action on the UI as either mouse or gesture or touch input. If the application detects a mouse input, the UI may display mouse input optimized text style control 702 or search control 710 associated with corresponding user action. The UI may display text style control 702 with standard text style selection controls 706 or search control 710 with standard size search box control 714. The UI may display standard size controls because a user may be able to move a mouse pointer with more accuracy compared to other types of input.

Alternatively, if the application detects a gesture or touch input, the UI may display a gesture or touch input optimized font style control 704 or search control 712 associated with corresponding user action. The UI may display font style control 704 with large size font style selection control 708 or search control 712 with large size search box control 716. The UI may display large size controls because a user may be less able to provide fine control over a UI through gesture or touch input.

The application may also enable a user to select the type of input through drop down menu control 720. The application may notify the user to tap with a finger anywhere on the UI to activate the dropdown menu 726. The UI may also display a notification informing the user to click at a control surface of the drop down menu for bullet actions 722. The bullet actions may provide additional controls associated with the type of input, for example managing behavior of the type of input. In addition, the UI may display a notification to inform the user to click an arrow control 724 of the drop down menu to activate a selection control to select the type of input.

According to some embodiments, a touch or gesture-enabled input device and display screen may be utilized for viewing/editing documents and receiving input from a user over a user interface. The gesture-enabled input device and display screen may utilize any technology that allows touch input or optically captured gestures by a user to be recognized. For example, some technologies may include, but are not limited to: heat, finger pressure, high capture rate cameras, infrared light, optic capture, tuned electromagnetic induction, ultrasonic receivers, transducer microphones, laser rangefinders, shadow capture, and the like. The user interface of a touch-enabled or gesture-enabled device may display content and documents associated with word processing applications, presentation applications, spreadsheet applications and web page content, and menus of actions for interacting with the displayed content. A user may use gestures to interact with the user interface to access, create, view and edit the content, such as documents, tables, spreadsheets, charts, lists, and any content (e.g., audio, video, etc.). The gesture-enabled input device may make use of features specific to touch or gesture enabled computing devices, but may also work with a traditional mouse and keyboard. A gesture or touch input action, such as a tap or swipe action as used herein may be provided by a user through a finger, a pen, a mouse, or similar device, as well as through predefined keyboard entry combinations, eye-tracking, and/or a voice command.

The example scenarios and schemas in FIGS. 2 through 7 are shown with specific components, data types, and configurations. Embodiments are not limited to systems according to these example configurations. Providing custom selection for editing content on a gesture or touch screen, a scheme for semantic interpretation of browser gesture or touch events, and a gesture or touch optimized user interface in the browser may be implemented in configurations employing fewer or additional components in applications and user interfaces. Furthermore, the example schema and components shown in FIGS. 2 through 7 and their subcomponents may be implemented in a similar manner with other values using the principles described herein.

Figure 8:
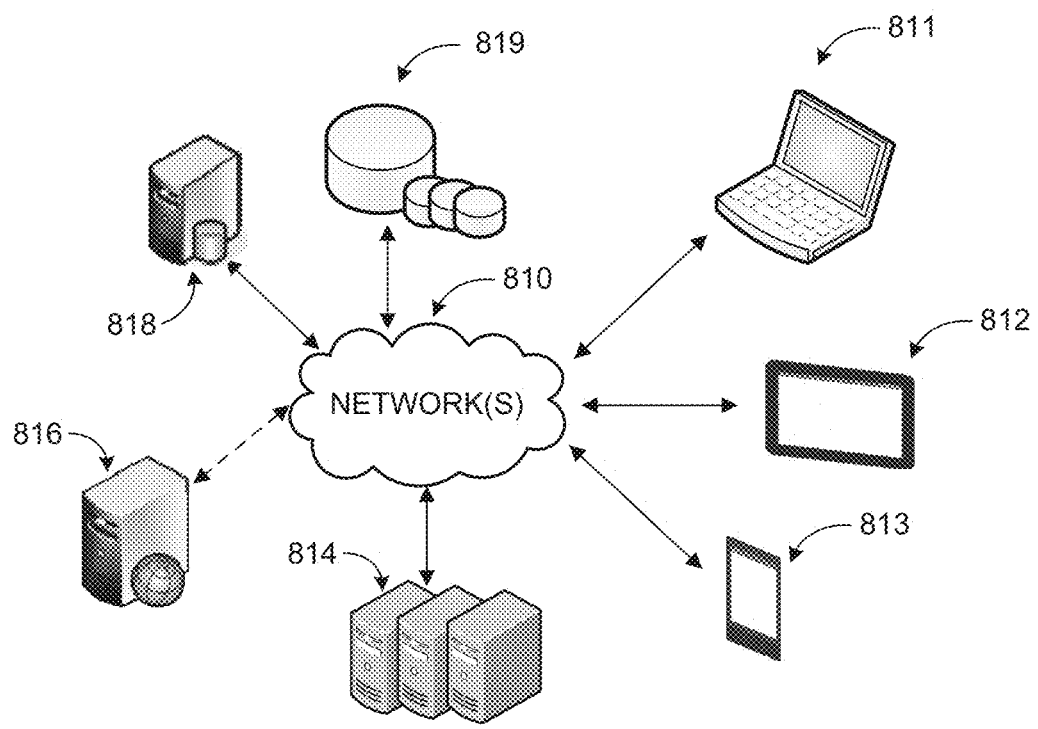
FIG. 8 is a networked environment, where a system according to embodiments may be implemented.

FIG. 8 is a networked environment, where a system according to embodiments may be implemented. Local and remote resources may be provided by one or more servers 814 or a single server (e.g. web server) 816 such as a hosted service. An application may communicate with client interfaces on individual computing devices such as a laptop 811, a tablet device 812 or a smart phone 813 ('client devices') through network(s) 810.

As discussed above, custom selection for editing content on a gesture or touch screen, a scheme for semantic interpretation of browser gesture or touch events, and a gesture or touch optimized user interface in the browser may be provided through a web application interacting with a browser. Client devices 811-813 may enable access to applications executed on remote server(s) (e.g. one of servers 814) as discussed previously. The server(s) may retrieve or store relevant data from/to data store(s) 819 directly or through database server 818.

Network(s) 810 may comprise any topology of servers, clients, Internet service providers, and communication media. A system according to embodiments may have a static or dynamic topology. Network(s) 810 may include secure networks such as an enterprise network, an unsecure network such as a wireless open network, or the Internet. Network(s) 810 may also coordinate communication over other networks such as Public Switched Telephone Network (PSTN) or cellular networks. Furthermore, network(s) 810 may include short range wireless networks such as Bluetooth or similar ones. Network(s) 810 may provide communication between the nodes described herein. By way of example, and not limitation, network(s) 810 may include wireless media such as acoustic, RF, infrared and other wireless media.

Many other configurations of computing devices, applications, data sources, and data distribution systems may be employed to provide custom selection for editing content on a gesture or touch screen, a scheme for semantic interpretation of browser gesture or touch events, and a gesture or touch optimized user interface in the browser. Furthermore, the networked environments discussed in FIG. 8 are for illustration purposes only. Embodiments are not limited to the example applications, modules, or processes.

Figure 9:
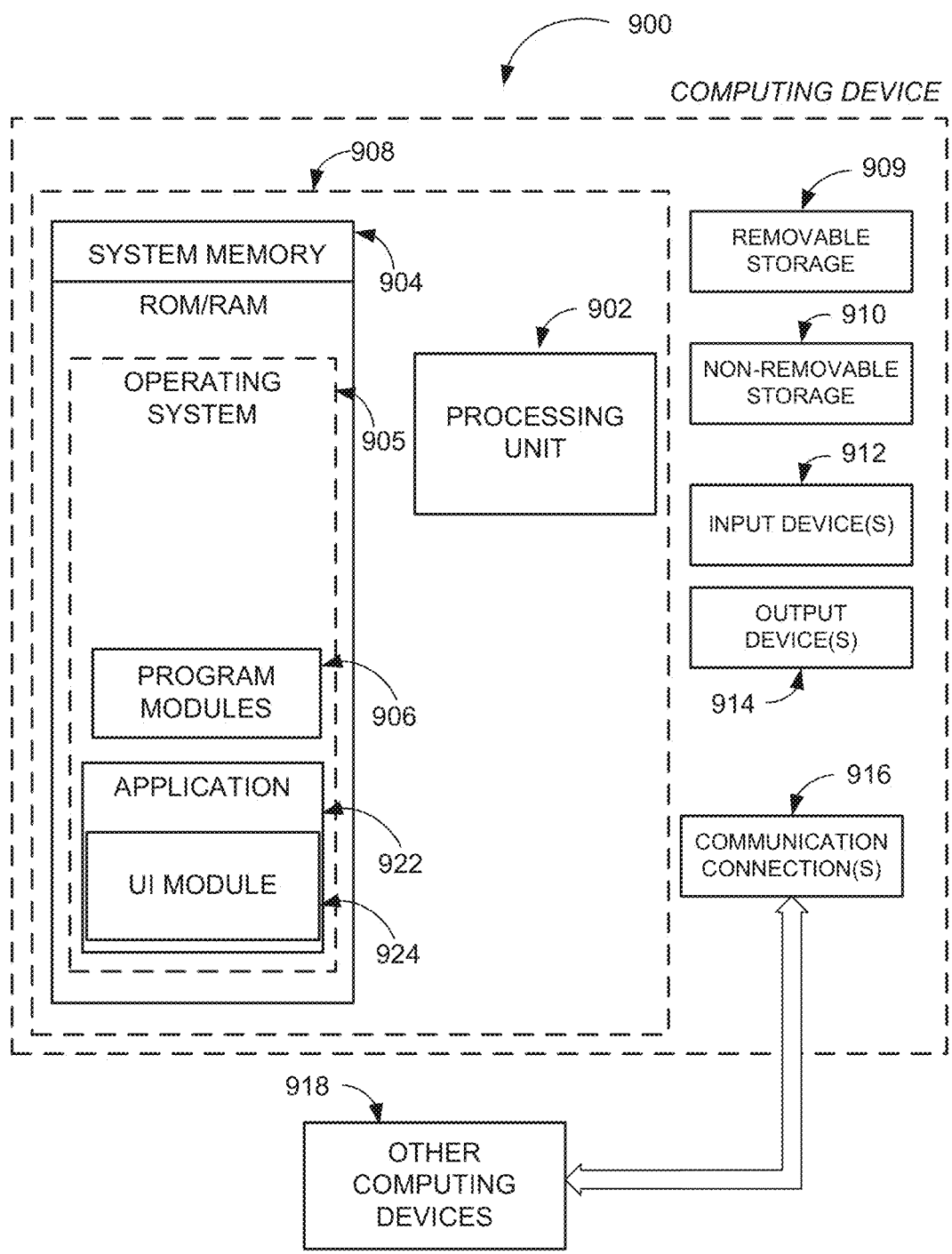
FIG. 9 is a block diagram of an example computing operating environment, where embodiments may be implemented.

FIG. 9 and the associated discussion are intended to provide a brief, general description of a suitable computing environment in which embodiments may be implemented. With reference to FIG. 9, a block diagram of an example computing operating environment for an application according to embodiments is illustrated, such as computing device 900. In a basic configuration, computing device 900 may include at least one processing unit 1602 and system memory 904. Computing device 900 may also include a plurality of processing units that cooperate in executing programs. Depending on the exact configuration and type of computing device, the system memory 904 may be volatile (such as RAM), non-volatile (such as ROM, flash memory, etc.) or some combination of the two. System memory 904 typically includes an operating system 905 suitable for controlling the operation of the platform, such as the WINDOWS® operating systems from MICROSOFT CORPORATION of Redmond, Wash. The system memory 904 may also include one or more software applications such as program modules 906, an application 922, and user interface module 924.

An application 922 may provide custom selection for editing content on a gesture or touch screen, a scheme for semantic interpretation of browser gesture or touch events, and/or a gesture or touch optimized user interface in a browser according to embodiments. The user interface module 924 may assist the application 922 in providing above described services in conjunction with a touch and/or gesture enabled device. This basic configuration is illustrated in FIG. 9 by those components within dashed line 908.

Computing device 900 may have additional features or functionality. For example, the computing device 900 may also include additional data storage devices (removable and/or non-removable) such as, for example, magnetic disks, optical disks, or tape. Such additional storage is illustrated in FIG. 9 by removable storage 909 and non-removable storage 910. Computer readable storage media may include volatile and nonvolatile, removable and non-removable media implemented in any method or technology for storage of information, such as computer readable instructions, data structures, program modules, or other data. Computer readable storage media is a computer readable memory device. System memory 904, removable storage 909 and non-removable storage 910 are all examples of computer readable storage media. Computer readable storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 900. Any such computer readable storage media may be part of computing device 900. Computing device 900 may also have input device(s) 912 such as keyboard, mouse, pen, voice input device, gesture or touch input device, and comparable input devices. Output device(s) 914 such as a display, speakers, printer, and other types of output devices may also be included. These devices are well known in the art and need not be discussed at length here.

Computing device 900 may also contain communication connections 916 that allow the device to communicate with other devices 918, such as over a wireless network in a distributed computing environment, a satellite link, a cellular link, and comparable mechanisms. Other devices 918 may include computer device(s) that execute communication applications, storage servers, and comparable devices. Communication connection(s) 916 is one example of communication media. Communication media can include therein computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be co-located with each other, but each can be only with a machine that performs a portion of the program.

Figure 10A:
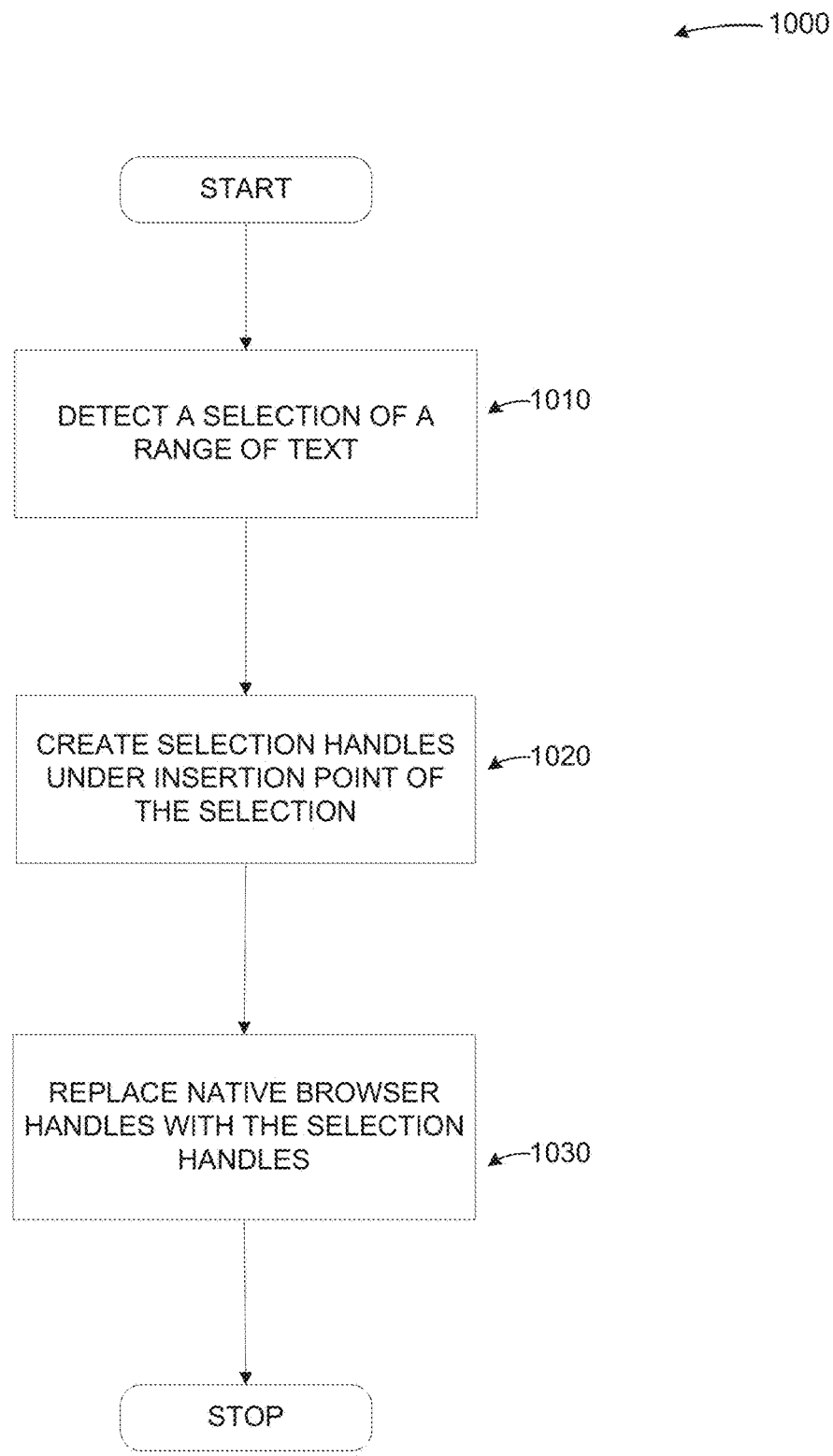
FIG. 10A illustrates a logic flow diagram for a process providing selection handles under an insertion point and at the ends of a range selection.
Figure 10B:
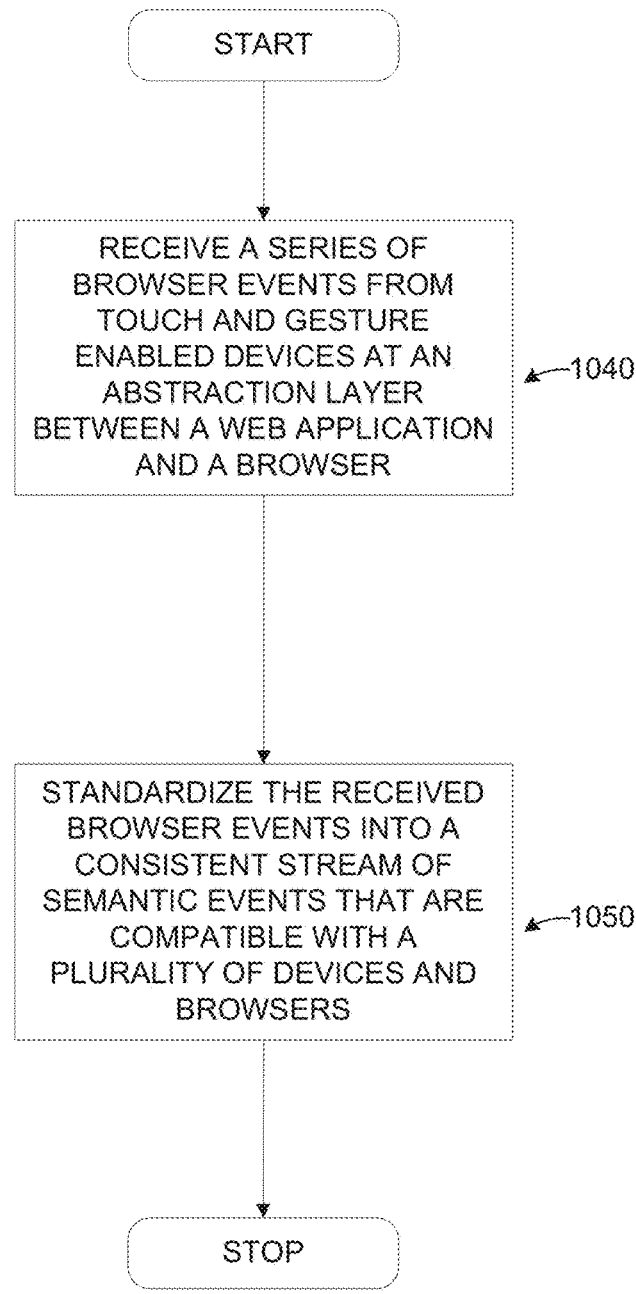
FIG. 10B illustrates a logic flow diagram for a process providing a scheme for semantic interpretation of browser gesture or touch events.
Figure 10C:
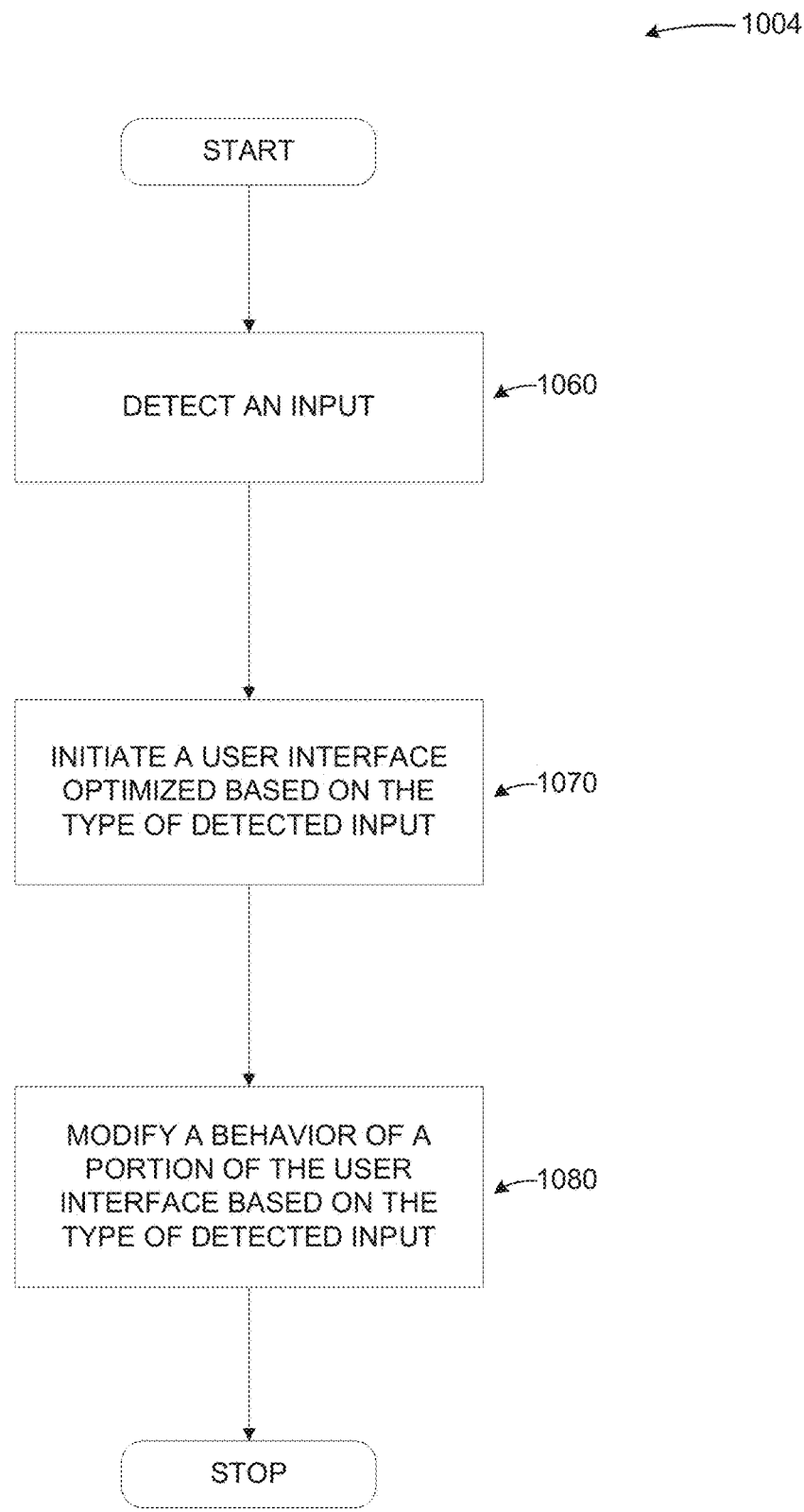
FIG. 10C illustrates a logic flow diagram for a process providing a gesture or touch optimized user interface for a browser.

FIG. 10A-C illustrate logic flow diagrams for processes providing selection handles under an insertion point and at the ends of a range selection, a scheme for semantic interpretation of browser gesture or touch events, and input optimized user interface for a browser. Process 1000, 1002, and 1004 may be implemented by an application such as a web application in some examples.

Process 1000 may begin with operation 1010 where an application may detect a selection of a range of text. At operation 1020, the application may create selection handles under insertion point of the selection. The application may intercept and cancel events associated with the selection generated by a browser. Next, the application may replace the native browser handles with the selection handles at operation 1030.

Process 1002 may begin with operation 1040 where an application may receive a series of browser events from touch and gesture enabled devices at an abstraction layer between the application and a browser. At operation 1050, the application may standardize the received browser events into a consistent stream of semantic events that are compatible with a plurality of devices and browsers.

Process 1004 may begin with operation 1060 where an application may detect an input. At operation 1070, the application may initiate a user interface optimized based on the type of detected input. Next, the application may modify a behavior of a portion of the user interface based on the type of the detected input at operation 1080.

Some embodiments may be implemented in a computing device that includes a communication module, a memory, and a processor, where the processor executes a method as described above or comparable ones in conjunction with instructions stored in the memory. Other embodiments may be implemented as a computer readable storage medium with instructions stored thereon for executing a method as described above or similar ones.

The operations included in processes 1000, 1002, and 1004 are for illustration purposes. Providing custom selection for editing content on a gesture or touch screen, a scheme for semantic interpretation of browser gesture or touch events, and a gesture or touch optimized user interface in the browser according to embodiments may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method executed on a computing device for transforming browser events into a semantic event comprehensible by an application executed by a remote server and hosted by a browser, the method comprising:

receiving, from the browser, a browser event generated in response to a user input received via a user interface outputted on the browser that is executed on the computing device, the browser event representing an input configured to initiate a browser action to handle a selection with an operating system of the computing device, the browser action being browser or computing device dependent;

upon receiving the browser event, determining, at the computing device, whether the received browser event matches a predetermined input event that corresponds to a semantic event of the application, the semantic event representing a command comprehensible by the application hosted by the browser and executed by the remote server;

in response to determining that the received browser event matches the predetermined input event, transmitting, from the computing device and via a computer network, the semantic event comprehensible by the application to the application executed by the remote server;

cancelling, in the browser, the received browser event on the computing device to prevent the browser action that is browser or computing device dependent from being performed on the computing device;

receiving, via the computer network, an object generated by the application executed on the remote server in response to the command represented by the semantic event; and rendering, at the computing device and via the interface in the browser, the received object generated by the application in response to the user input in the browser on the computing device.

2. The method of claim 1, wherein receiving the browser event generated in response to input received via the touch enabled device and determining whether the received browser event matches the predetermined input event comprises:
receiving, at a register event handler of an event handler manager, the browser event;
providing, through the register event handler, the browser event to at least one input manager associated with the browser event;
processing, by the at least one associated input manager, the browser event and a document object model element of the browser event; and
identifying, based on the processing, the semantic event associated with the browser event,
wherein providing, to the application, the semantic event comprehensible by the application comprises providing the semantic event through the event handler manager.

3. The method of claim 1, wherein:
the browser event comprises a series of browser events and the predetermined input event comprises a predetermined series of browser events,
cancelling, in the browser, the browser event comprises cancelling, in the browser, the series of browser events to prevent corresponding browser actions in the browser.

4. The method of claim 3, wherein the semantic event comprises a stream of semantic events emulating the series of browser events.

5. The method of claim 4, further comprising:
ordering the series of browser events based at least in part on corresponding priority values.

6. The method of claim 5, further comprising:
for the browser events with an equal priority, providing the browser events of the series in a random order.

7. The method of claim 4, further comprising:
notifying the application about the stream of semantic events at an input manager associated with the stream; and
notifying other input managers to stop listening for associated semantic events.

8. A computing system for transforming a browser event into a semantic event comprehensible by an application hosted by a browser and executed by a remote server, the computing system comprising:
a memory storing computer-executable instructions of:
receiving, from the browser, a browser event generated in response to a user input received via an interface of an application outputted by the browser, the browser event representing an input configured to initiate a browser action to handle a selection with an operating system of the computing device, wherein the browser action is browser or computing system dependent;
upon receiving the browser event, determining, whether the received browser event matches a predetermined input event corresponds to a semantic event of the application, the semantic event representing a command comprehensible by the application executed by the remote server;
providing, to the application executed on the remote server, the semantic event from the computing system and via a computer network;
cancelling, in the browser, the browser event to prevent the browser action from being performed on the computing system;
receiving, via the computer network, an object generated by the application executed on the remote server in response to the command represented by the semantic event; and
rendering, via the interface of the application in the browser, the received object generated by the application executed on the remote server in response to the semantic event; and
a processor for executing the computer-executable instructions stored in the memory.

9. The computing system of claim 8, wherein the browser event comprises a series of browser events and the predetermined input event comprises a predetermined series of browser events,
wherein cancelling, in the browser, the browser event comprises cancelling, in the browser, the series of browser events to prevent corresponding browser actions from being performed on the computing system.

10. The computing system of claim 9, wherein the semantic event comprises a stream of semantic events emulating the series of browser events.

11. The computing system of claim 8, wherein the semantic event associated with the browser event is determined based at least in part on a type of input associated with the browser event.

12. The computing system of claim 11, wherein the type of input comprises a gesture or touch.

13. The computing system of claim 11, wherein the type of input comprises a stylus input.

14. The computing system of claim 11, wherein the type of input comprises a mouse click.

15. A method executed on a computing device for transforming browser events into a semantic event comprehensible by a web application executed by a remote server and hosted by a browser on the computing device, the method comprising:
upon receiving, in response to a user input to a user interface of the application on the browser, a browser event representing an input configured to initiate a browser action that is browser dependent or computing device dependent,
determining, at the computing device, whether the received browser event matches a predetermined input event corresponds to a semantic event of the application, the semantic event representing a command comprehensible by the application hosted by the browser and executed by the remote server; and
in response to determining that the received browser event matches the predetermined input event,
transmitting, from the computing device and via a computer network, the command represented by the semantic event to the remote server in lieu of performing the browser action on the computing device;
receiving, via the computer network, an object generated by the application executed on the remote server in response to the command represented by the semantic event; and
rendering, at the computing device and via the interface in the browser, the received object generated by the application in response to the user input in the browser on the computing device.

16. The method of claim 15, further comprising providing an indication of the browser event and a type of input of the browser event to the application, wherein the type of input comprises a gesture, a touch, a stylus input, or a mouse click.

17. The method of claim 15, wherein the browser event comprises a series of browser events and the semantic event comprises a stream of semantic events emulating the series of browser events.

18. The method of claim 15, further comprising cancelling, in the browser, the browser event to prevent the corresponding browser action from being performed on the computing device in response to determining that the received browser event matches the predetermined input event.

19. The method of claim 15, wherein:
the browser event includes multiple browser sub-events; and
determining whether the received browser event matches the predetermined input event includes determining whether the multiple browser sub-events represent a pattern that matches the predetermined input event.

20. The method of claim 15, wherein:
the browser event includes multiple browser sub-events;
determining whether the received browser event matches the predetermined input event includes determining whether the multiple browser sub-events represent a pattern that matches the predetermined input event; and
in response to determining that the multiple browser sub-events represent a pattern that matches the predetermined input event, cancelling, in the browser, the multiple browser sub-events to prevent corresponding browser actions from being performed on the computing device.

* * * * *